US007062023B2

(12) United States Patent
Izaki

(10) Patent No.: US 7,062,023 B2
(45) Date of Patent: Jun. 13, 2006

(54) TELEPHONE TERMINAL WITH ALARM

(75) Inventor: Takeshi Izaki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/902,179

(22) Filed: Jul. 30, 2004

(65) Prior Publication Data
US 2005/0069108 A1    Mar. 31, 2005

(30) Foreign Application Priority Data
Sep. 30, 2003    (JP)    ............................. 2003-339677

(51) Int. Cl.
H04B 1/00    (2006.01)
(52) U.S. Cl. .............. 379/110.01; 455/567; 455/556.1; 379/433.01
(58) Field of Classification Search ........... 379/110.01, 379/207.03, 387.01, 252, 433.01; 455/418, 455/343.4, 567, 574, 556.1; 568/13
See application file for complete search history.

(56) References Cited

FOREIGN PATENT DOCUMENTS
JP        A 11-55150        2/1999

Primary Examiner—Melur Ramakrishnaiah
(74) Attorney, Agent, or Firm—Oliff & Berridge, PLC

(57) ABSTRACT

An telephone terminal with an alarm which can output an alarm sound without harming the user's ear. In the case where the present time reaches the preset alarm time while a cordless handset of the telephone terminal is in call status, output of an alarm sound is withheld. When the call on the handset is terminated, an alarm sound is outputted at a preset volume from a speaker of the handset after a predetermined hold time passes from the time of the termination of the call. In the case where the present time reaches the preset alarm time while the handset is in operation status to input information, the output of the alarm sound is withheld. When the operation of the handset is terminated, the alarm sound is outputted at a lower volume than the preset volume, from the speaker of the handset.

9 Claims, 6 Drawing Sheets

TELEPHONE TERMINAL WITH ALARM

BACKGROUND OF THE INVENTION (1) Field of the Invention

This invention relates to a telephone terminal with an alarm which outputs an alarm sound at a preset time.

(2) Background Art

Amongst those telephone terminals that can output an alarm sound at a preset alarm time, there is a telephone terminal disclosed by Takahashi (Unexamined Japanese Patent Publication No. 11-55150) which withholds the output of the alarm sound at the preset alarm time while the telephone terminal is used for a telephone call.

Generally, an alarm sound is outputted from a speaker at a certain volume so as to be heard in the vicinity of a telephone terminal. Thereby, a cordless handset of a telephone terminal, having a transmitter/receiver for the telephone call and a speaker for the output of an alarm sound stored therein, outputs an alarm sound immediately after a call is terminated, while an ear of the user is still near the handset. This can harm a user's hearing.

Moreover, when the preset time comes to output an alarm sound while a user is inputting information by using operation keys, if the alarm sound is outputted from the speaker immediately after the key operation is finished, the sound may be outputted while the handset is in the user's hand. This can also harm the user's hearing.

The present invention was made in consideration of the above-described issues and one of its purposes is to provide a telephone terminal with an alarm whose sound can be outputted without harming a user's hearing.

SUMMARY OF THE INVENTION

To attain this and other objects, a telephone terminal with an alarm, including a transmitter/receiver which inputs and outputs sound, an operation unit with which a user may input various information, and an alarm sound generator which generates an alarm sound to let the user know that the present time has reached the preset alarm time, comprises a first, second, and third alarm sound controllers. The first alarm sound controller commands the alarm sound generator to generate an alarm sound at a preset volume if the telephone is in a standby status at the preset alarm time. That is, the telephone terminal is neither in a call status, wherein a user is using the telephone terminal for a call, nor in an operation status, wherein a user is using the telephone terminal for operating the operation unit, at the preset alarm time. The second alarm sound controller commands the alarm sound generator to generate an alarm sound at a preset volume, after the status of the telephone terminal changes from a call status to a standby status and after a predetermined time passes, if the telephone is in a call status at the preset alarm time. The length of the predetermined time is generally long enough for a user to remove the transmitter/receiver from the user's ear after the termination of a call. The third alarm sound controller commands the alarm sound generator to generate an alarm sound at a lower volume than the preset volume, after the status of the telephone terminal changes from an operation status to a standby status, if the telephone terminal is in an operation status at the preset alarm time.

According to a telephone terminal with an alarm configured as above, when the present time reaches the preset alarm time to generate an alarm sound, if the telephone terminal is in a standby status, the first alarm sound controller commands the alarm sound generator to generate an alarm sound at a preset volume. If the telephone is in a call status at the predetermined time, a certain length of time (considered to be long enough for a user to remove the transmitter/receiver from the user's ear subsequent to the termination of a call) passes after the change of status of the telephone terminal from a call status to a standby status, then the second alarm sound controller commands the alarm sound generator to generate an alarm sound at a preset volume. If the telephone terminal is in an operation status when the preset alarm time is reached, after the status of the telephone terminal changes from an operation status to a standby status the third alarm sound controller commands the alarm sound generator to generate an alarm sound at a lower volume than the preset volume.

In other words, when the present time reaches the preset alarm time while the telephone terminal is in a call status, an alarm sound is generated at a preset volume after the user finishes a call and the transmitter/receiver is removed from the user's ear. Therefore, an alarm sound is not generated near the user's ear. This system can inhibit the alarm sound from harming the user's hearing.

Moreover, when the present time reaches the preset alarm time while a user is operating the operation unit, an alarm sound is generated at a lower volume than the preset volume, immediately after the user finishes the operation of the operation unit (i.e. while the telephone terminal is still in the user's hand). This system can also inhibit the alarm sound from harming the user's hearing. In other words, the alarm sound is generated immediately after the termination of an operation of the operation unit because the distance between the user's ear and the transmitter/receiver immediately after an operation is relatively longer than the same distance immediately after the termination of a call. However the distance between the user's ear and the transmitter/receiver is not so great so as to allow the alarm sound to be generated at the preset volume. Hence, the alarm sound is generated at a lower volume than the preset volume.

The telephone terminal with an alarm described above preferably comprises a setting inputter, by which a user may input setting information to set the predetermined time, and a hold time changer, which changes the predetermined time according to the setting information inputted from the setting inputter.

In the telephone terminal with an alarm configured as above, the predetermined time can be changed by a user to various arbitrary lengths of time.

The telephone terminal with an alarm preferably furthermore comprises an alarm image displayer, which displays an alarm screen image to let the user know that the present time has reached the preset alarm time, and an alarm image controller, which commands the alarm image displayer to show the alarm screen image after the telephone terminal goes back to a standby status from a call status if the telephone terminal was previously in a call status at the preset alarm time.

According to the telephone terminal with an alarm configure as above, the alarm screen image is displayed immediately after the telephone terminal goes back to a standby status from a call status. Thus, a user can be informed, even before the predetermined time passes, that the preset alarm time has come by simply looking at the alarm image displayer.

The telephone terminal with an alarm of the present invention can be applied to a cordless handset of a telephone set. A cordless handset generally comprises a charger which charges a battery stored in the handset. A cordless handset is usually placed on the charger when the handset is not engaged in a call or an operation. Thereby, the second alarm sound controller preferably commands the alarm sound generator to generate an alarm sound after the telephone terminal goes back to a standby status from a call status, if the handset is placed on the charger before the predetermined time passes.

In the configuration above, when the handset is placed on the charger, the transmitter/receiver is determined to be away from the user's ear even before the predetermined time passes.

By using a telephone terminal configured as above, a user can be informed earlier that a preset alarm time has come without having the user's hearing harmed.

BRIEF DESCRIPTION OF THE DRAWINGS

The invention will now be described below, by way of example, with reference to the accompanying drawings.

DETAILED DESCRIPTION OF THE PREFERRED EMBODIMENT

Embodiment

Figure 1:
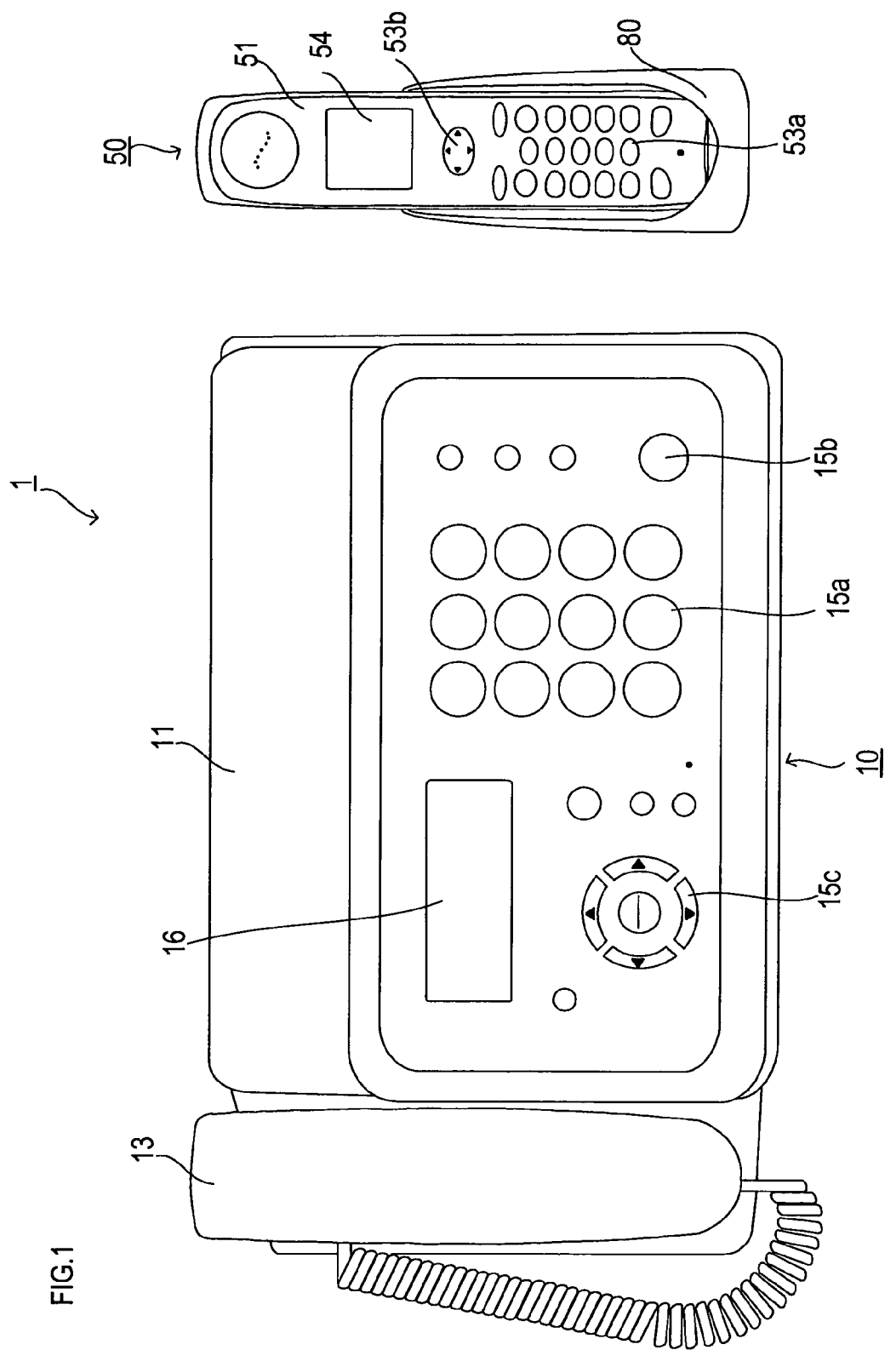
FIG. 1 is a front elevation of a telephone set of the embodiment according to the present invention.

Referring to FIG. 1, the telephone set 1 comprises a base unit 10 connected to a telephone line network 100 (shown in FIG. 2), a cordless handset 50 which cordlessly communicates with the base unit 10, and a charger 80 connected (illustrated in FIG. 2) to an external power source (not shown) and configured to allow the placement of the cordless handset 50 detachably thereon so as to charge the cordless handset 50 at a predetermined voltage.

On one side of a unit case 11 of the base unit 10, a handset 13 of the base unit 10 is attached as a transmitter/receiver. When a user uses the handset 13, the handset 13 is detached (off-hooked) from the base unit 10. Furthermore, number keys 15a with which the telephone number of an intended party is inputted, a start key 15b, other operation keys 15 (shown in FIG. 2) including a selection key 15c, and a display panel 16 that displays information relating to various functions, are equipped on the top surface of the unit case 11.

On the surface of a unit case 51 of the cordless handset 50, there are number keys 53a with which the telephone number of an intended party is inputted, other operation keys 53 (shown in FIG. 2) including a selection key 53c, and a display panel 54 that displays information relating to various functions.

The base unit 10 and the cordless handset 50 are configured to be able to send and receive various signals, including audio signals, by wireless communication. Telephone communication can be conducted between the base unit 10 and the cordless handset 50. It is also possible to make external calls with the cordless handset 50 though the base unit 10.

Figure 2:
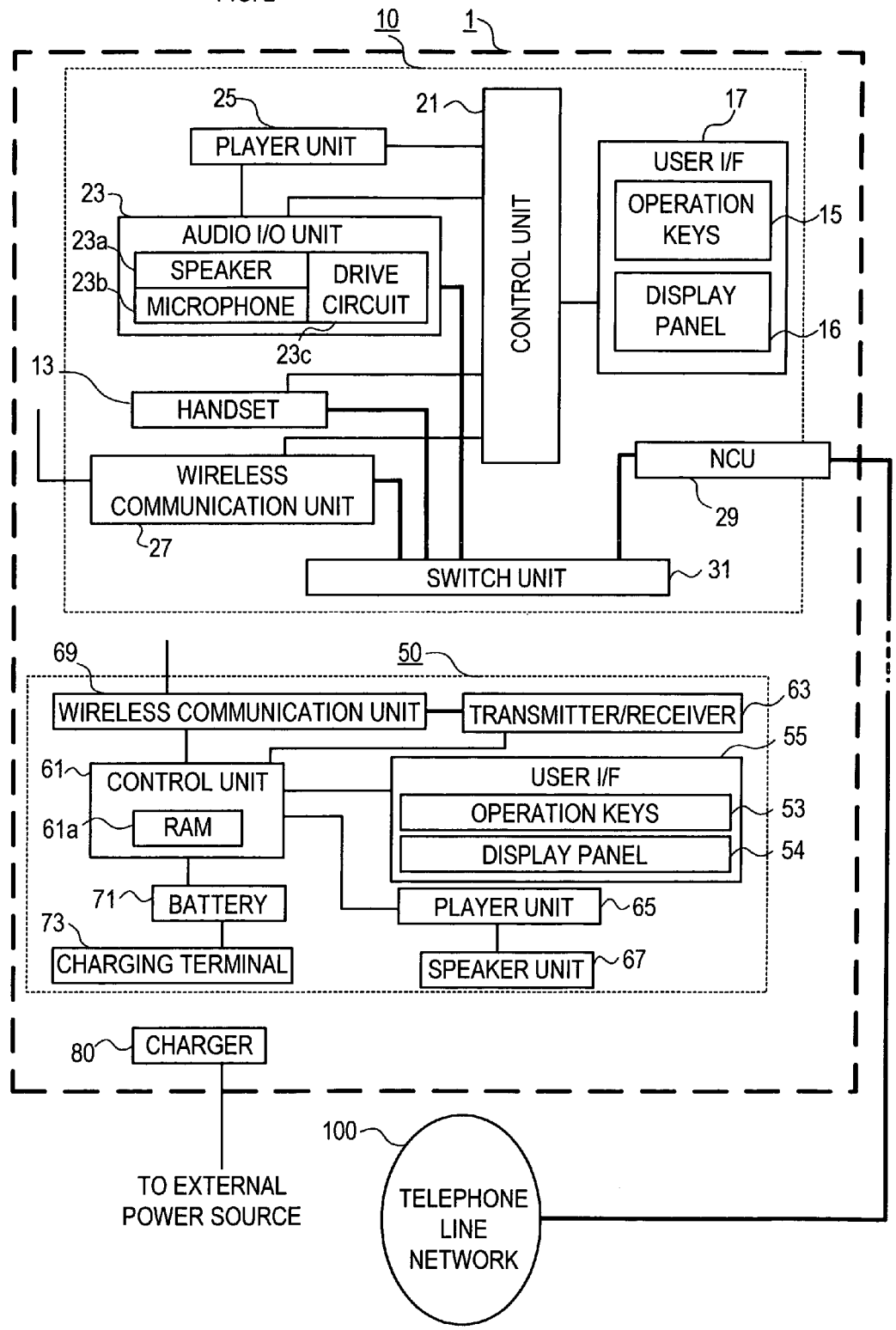
FIG. 2 is a block diagram to show the structure of the telephone set of an embodiment.

The following describes the electrical structure of the telephone set 1. FIG. 2 is a block diagram showing the electrical structure of the telephone set 1.

The base unit 10 comprises a control unit 21 which controls the operation of entire base unit 10, a handset 13, a user interface unit (referred to as a user I/F) 17, having operation keys 15 and a display panel 16, an audio input/output unit 23 (to be referred to as audio I/O unit 23) which inputs and outputs sound, a player unit 25 which plays sound based on prestored audio signals, a wireless communication unit 27 which sends/receives various signals including audio signals to/from the cordless handset 50 via wireless communication, a NCU (Network Control Unit) 29 which inputs and outputs audio signals transmitted via the telephone line network 100, and a switch unit 31 which switches the transmission paths of audio signals in the base unit 10.

The audio I/O unit 23 comprises a speaker 23a, a microphone 23b, and a drive circuit 23c which drives the speaker 23a and the microphone 23b. Not only outputting sound from the speaker 23a based on audio signals, the audio I/O unit 23 also enables hands-free communication by using the speaker 23a and the microphone 23b as a transmitter/receiver.

The player unit 25 stores audio signals such as the ringing tone used when there is an incoming call and the holding tone used when a call is on hold. The player unit 25 plays sounds based upon the stored audio signals by a command from the control unit 21. The sounds of the audio signals played by the player unit 25 are outputted from the speaker 23a.

The wireless communication unit 27 sends/receives various signals, including audio signals, to/from the cordless handset 50 via wireless communication.

The switch unit 31 switches the transmission paths of the input/output audio signals sent from/to an outside source to one of the units among a handset 13, a sound transmission unit 23, and a wireless communication unit 27. To be more precise, when the handset 13 is detached (off-hooked) from the body of the base unit 10, the switch unit 31 switches the transmission path to the handset 13. When an operation to initiate hands-free communication is conducted with the operation keys 15 of the user I/F 17, the switch unit 31 switches the transmission path to the audio I/O unit 23. When an operation to initiate communication is conducted on the cordless handset 50 (by an operation upon the operation keys 53 which will be described later), the switch unit 31 switches the transmission path to the wireless communication unit 27.

The cordless handset 50 comprises a control unit 61 which controls the operation of entire cordless handset 50; a transmitter/receiver 63 having a speaker, a microphone and a drive circuit which drives the speaker and the microphone; a user I/F 55 having operation keys 53 and the display panel 54; a player unit 65 which plays sound based upon prestored audio signals; a speaker unit 67 having a speaker which outputs sound played by the player unit 65 and a drive circuit which drives the speaker; a wireless communication unit 69 which sends/receives various signals including audio signals to/from (the wireless communication unit 27 of) the base unit 10 via wireless communication; a battery 71 which provides electric power to the entire cordless handset 50; and a charging terminal 73 used for charging the battery 71 from the charger 80.

The control unit 61 comprises RAM 61a which stores data inputted from outside.

In the player unit 65, audio signals such as the ringing tone used when there is an incoming call, the holding tone used an audio call is on hold, and an alarm sound used to let the user know when the preset alarm time is reached, are stored.

When an operation is conducted upon the operation keys 53 and time setting information, which specifies the time when the above-mentioned alarm sound is outputted from the speaker unit 67, is inputted with the user I/F 55, the control unit 61 stores the information in the RAM 61a. Correspondingly, when an operation is conducted upon the operation keys 53 and volume setting information, which specifies the volume at which the alarm sound is outputted from the speaker unit 67, is inputted with the user I/F 55, the control unit 61 stores the information in the RAM 61a.

When an operation is conducted upon the operation keys 53 and a command to set hold time (to be described later) and hold time setting information, which specifies the length of hold time, are inputted with the user I/F 55, the control unit 61 executes a hold time setting process (to be described later) based upon the command to set hold time and the hold time setting information.

When the cordless handset 50 is in an operation status or when an operation is performed upon the operation keys 53, the control unit 61 commands the display panel 54 to show a display image such as the ones shown in FIGS. 3A to 3E. FIGS. 3A to 3E are explanatory views to show various display images on the display panel 54.

Figure 3A:
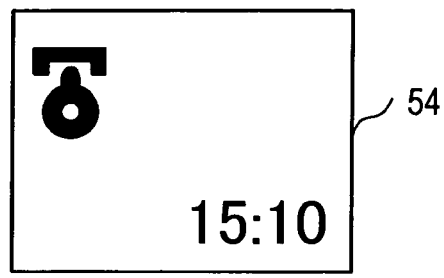
FIGS. 3A to 3E are explanatory views to show display images on a cordless handset of an embodiment.

When the cordless handset 50 is standing by for an incoming call, i.e. in a standby status, the control unit 61 commands the display panel 54 to display the screen image shown in FIG. 3A, illustrating a telephone in a standby status in the upper left part of the screen and showing the present time in the lower right part.

Figure 3B:
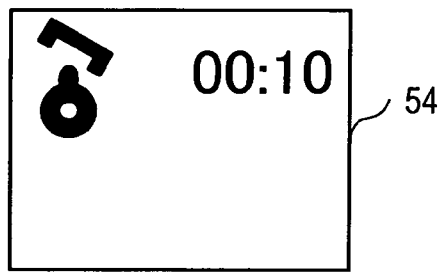

When a user initiates a call with the cordless handset 50 by operating the operation keys 53, the control unit 61 commands the display panel 54 to show the screen image shown in FIG. 3B, illustrating a telephone engaged in a call in the upper left part of the screen and showing the elapsed time since the initiation of the call in the upper right part.

Figure 3C:
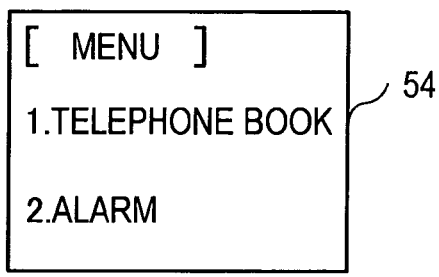
Figure 3D:
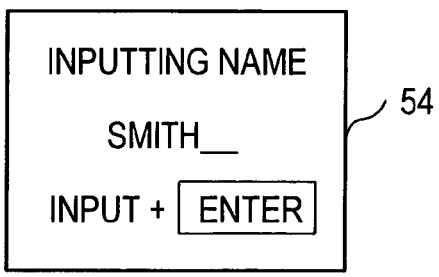
Figure 3E:
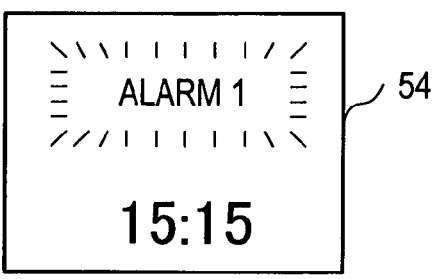

When a user conducts an operation upon the operation keys 53 in order to display a menu screen so as to select one of the functions of the cordless handset, the control unit 61 commands the display panel 54 to show the screen image shown in FIG. 3C, displaying choices of the menu such as "1. TELEPHONE BOOK", used to register a name and a telephone number of an intended party of a call, and "2. ALARM" used to set the alarm time.

While the display panel 54 is showing the screen image of FIG. 3C, if the user conducts an operation on the operation keys 53 so as to select "1. TELEPHONE BOOK", the control unit 61 commands the display panel 54 to show the screen image shown in FIG. 3D for inputting the name of the intended party.

On the other hand, while the display panel 54 is showing the screen image of FIG. 3C, if a user selects "2. ALARM" and sets the alarm time, when the present time reaches the preset alarm time, the control unit 61 commands the display panel 54 to display the alarm screen image shown in FIG. 3E, indicating "ALARM 1" blinking in the upper part of the screen and the present time in the lower part.

When the cordless handset 50 is connected to the charger 80 through the charging terminal 73, power is supplied to the battery 71 from an external power source through the charger 80.

Figure 4:
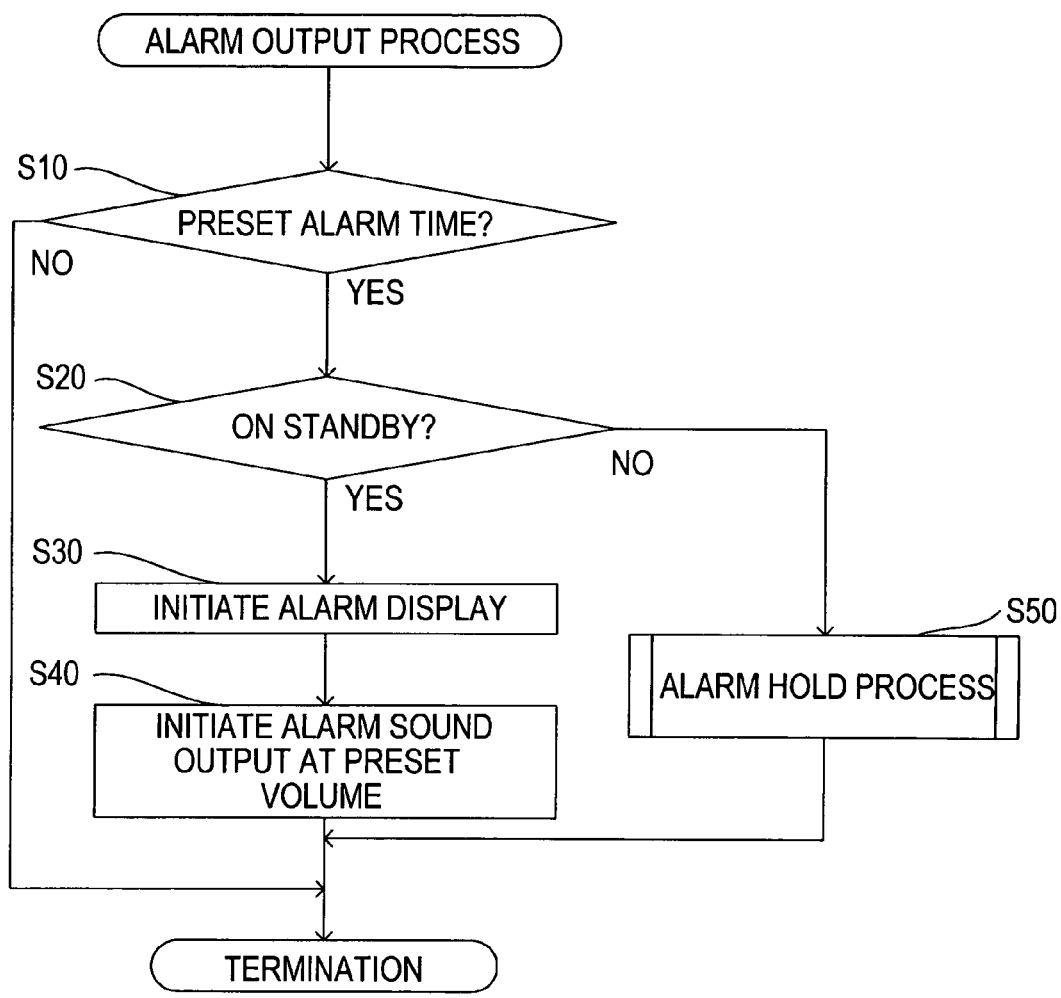
FIG. 4 is a flowchart showing the procedure of an alarm output process of an embodiment.

The following describes the procedure of an alarm output process. The alarm output process is for the cordless handset 50 to output an alarm sound when the present time reaches a preset alarm time. FIG. 4 is a flowchart showing the procedure of the alarm output process. This alarm output process is repeatedly conducted by the control unit 61 of the cordless handset 50 while the cordless handset 50 is activated (i.e. the power is on).

In S10 of the alarm output process, the control unit 61 determines whether or not the present time has reached the preset alarm time specified in the time setting information stored in RAM 61a. If the control unit 61 determines that the present time has not yet reached the preset alarm time (S10:NO), the control unit 61 terminates the alarm output process. To the contrary, if the control unit 61 determines that the present time has reached the preset alarm time (S10:YES), the process proceeds to S20.

In S20, the control unit 61 determines whether or not the cordless handset 50 is in a standby status. That is, the cordless handset 50 is neither in a call status nor in an operation status. If the cordless handset 50 is in a standby status (S20:YES), the alarm display is initiated on the display panel 54 in S30, output of an alarm sound is initiated from the speaker unit 67 at the preset volume specified in the volume setting information stored in RAM 61a in S40, and then the alarm output process is terminated.

Contrastingly, in S20, if the control unit 61 determines that the cordless handset 50 is not in a standby status (S20:NO), the process proceeds to S50 and an alarm hold process is conducted. After the alarm hold process is completed, the alarm output process is terminated.

Figure 5:
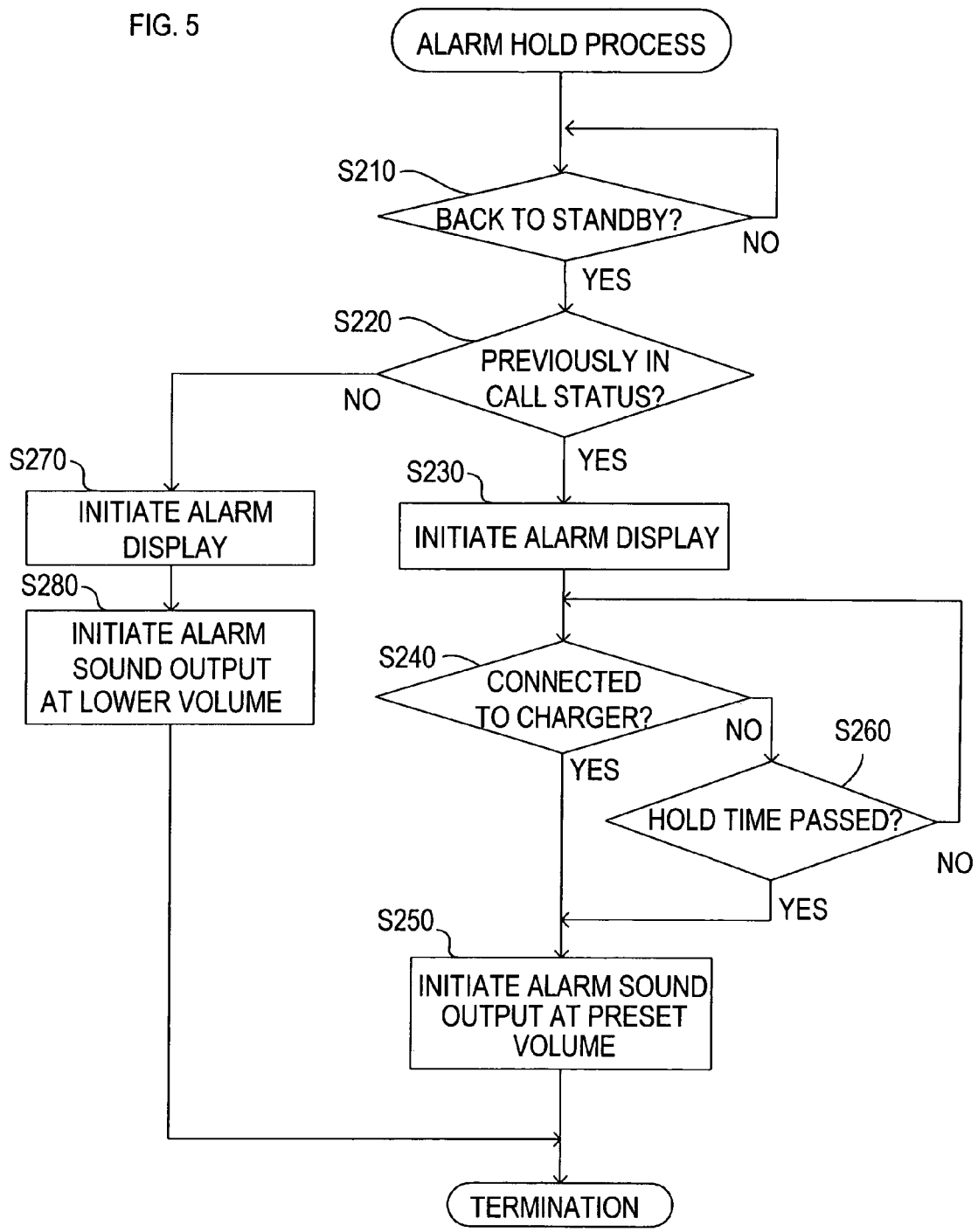
FIG. 5 is a flowchart showing the procedure of an alarm hold process of an embodiment.

The alarm hold process in S50 is conducted by the procedure shown in FIG. 5. FIG. 5 is a flowchart showing the alarm hold process.

In S210 of the alarm hold process, the control unit 61 determines whether or not the cordless handset 50 is returned back to a standby status. When the control unit 61 determines that the cordless handset 50 is back in a standby status (S210:YES), the process proceeds to S220. On the other hand, when the control unit 61 determines that the cordless handset 50 is not yet back in a standby status (S210:NO), the process of S210 is repeated.

In S220, the control unit 61 determines whether or not the cordless handset 50 was in a call status before a standby status. When the control unit 61 determines that the cordless handset 50 was previously in a call status (S220:YES), the alarm display is initiated on the display panel 54 in S230, and the process proceeds to S240.

In S240, the control unit 61 determines whether or not the cordless handset 50 is connected to the charger 80. If the control unit 61 determines that the cordless handset 50 is connected to the charger 80 (S240:YES), output of an alarm sound is initiated at a preset volume from the speaker unit 67 in S250, and the alarm hold process is terminated.

In contrast, if the control unit 61 determines that the cordless handset 50 is not connected to the charger 80 (S240:NO), the control unit 61 determines, in S260, whether or not the hold time (for example 5 seconds), specified in the hold time setting information stored in RAM 61a in the hold time setting process (to be described later), has passed since the cordless handset 50 went back to a standby status. If the control unit 61 determines that the hold time has already passed (S260:YES), the process proceeds to S250. If the control unit 61 determines that the hold time has not yet passed (S260:NO), the process goes back to S240 and the process of S240 described earlier is repeated.

In S220, if the control unit 61 determines that the cordless handset 50 was not previously in a call status, the control unit 61 determines that the cordless handset 50 was in an operation status. Subsequently, the alarm display on the display panel 54 is initiated in S270. In S280, output of an alarm sound is initiated from the speaker unit 67 at a lower volume than the preset volume. Then, the alarm hold process is terminated.

If there is an operation to terminate the output of the alarm sound on the operation keys 53 while the alarm sound is outputting from the speaker 67, the control unit 61 commands the speaker unit 67 to terminate the output of the alarm sound. Similarly, if there is an operation upon the operation keys 53 to terminate the alarm display shown on the display panel 54, while the alarm display is shown on the display panel 54, the control unit 61 commands the display panel 54 to terminate the alarm display.

In other words, in the above-described alarm output process, if the present time reaches the preset alarm time specified in the time setting information while the cordless handset 50 is in a call status, the outputting of an alarm sound is withheld. When the call of the cordless handset 50 is terminated and the hold time specified in the hold time setting information passes, the alarm sound is outputted at the preset volume. Meanwhile, if the present time reaches the preset alarm time while the cordless handset 50 is in an operation status to input various information through the user I/F 55 (for example, operations relating to the display images on the display panel 54 shown in FIGS. 3C and 3D), the outputting of an alarm sound is withheld. When the operation upon the cordless handset 50 is terminated, the alarm sound is outputted at a lower volume than the preset volume.

Figure 6:
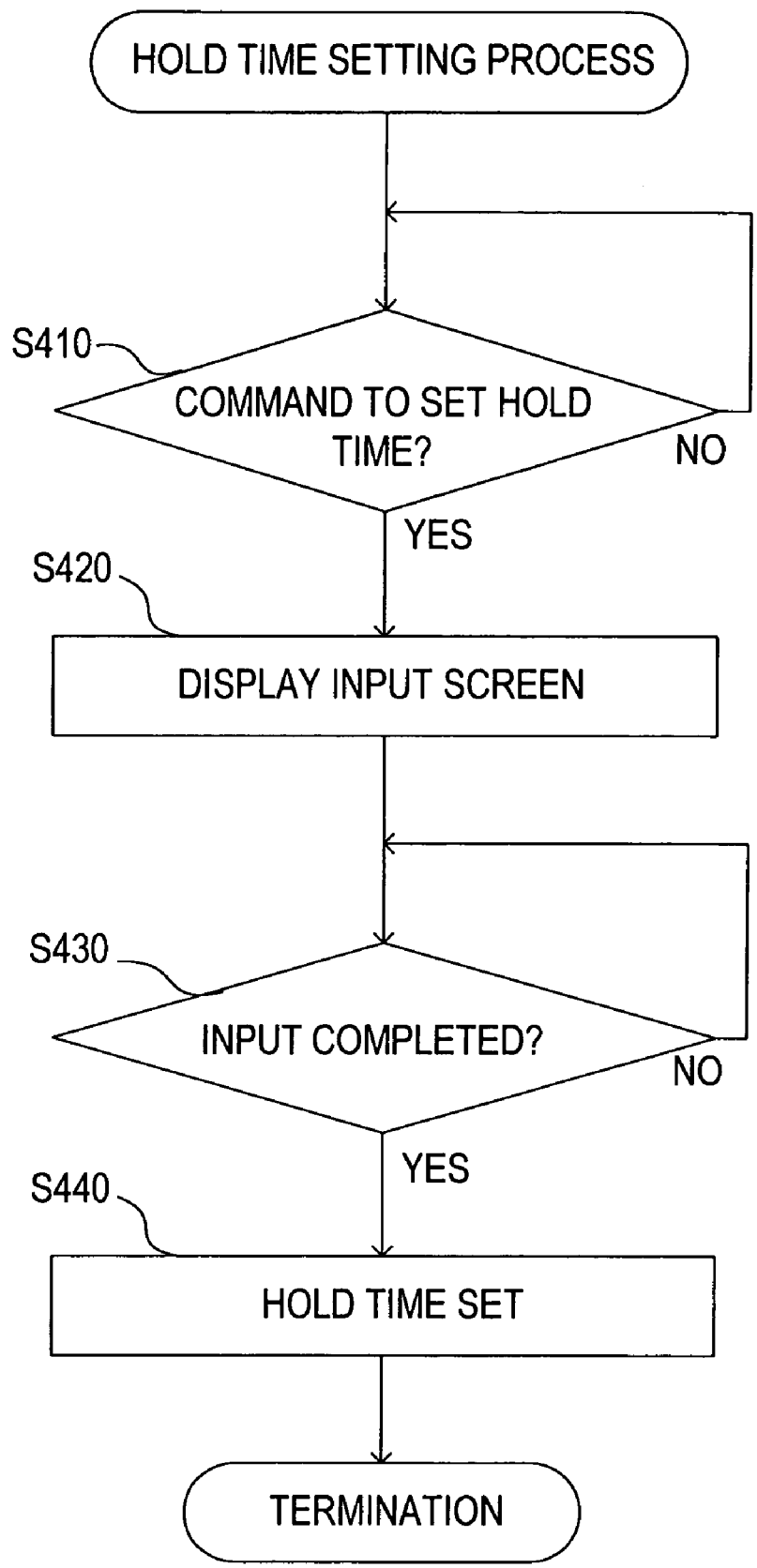
FIG. 6 is a flowchart showing the procedure of a hold time setting process of an embodiment.

In the following, the procedure of the hold time setting process mentioned earlier is described with reference to FIG. 6. FIG. 6 is a flowchart showing a procedure of the hold time setting process of an embodiment. This process allows a user to set the above-mentioned hold time by operating the operation keys 53. The process is repeatedly conducted by the control unit 61 while the cordless handset 50 is activated (i.e. the power is on).

In the hold time setting process, the control unit 61 is on standby until a command to set the hold time is inputted with the operation keys 53. In S410, if the control unit 61 determines that the command is inputted (S410:YES), in S420 the control unit 61 commands the display panel 54 to display an input screen for inputting the hold time setting information.

The control unit 61 stands by until the information for hold time setting is completely inputted.

When the inputting of the information is completed (S430:YES), the control unit 61 stores the information in RAM 61a in S440 and the hold time setting process is terminated.

According to the cordless handset 50 of the present embodiment, when the present time reaches the preset alarm time (S10:YES), if the cordless handset 50 is in a standby status (S20:YES), the alarm sound is outputted from the speaker unit 67 at the preset volume (S40). If the cordless handset 50 is in a call status (S220:YES), when the cordless handset 50 goes back to a standby status and the hold time passes (S260:YES), an alarm sound is outputted from the speaker unit 67 (S250). If the cordless handset 50 is in an operation status (S220:NO), when the cordless handset 50 goes back to a standby status, an alarm sound is outputted from the speaker unit 67 at a lower volume than the preset volume (S280).

That is to say, if the preset alarm time comes while the cordless handset is in a call status, an alarm sound goes off at the preset volume after a user finishes the call with the use of the cordless handset 50 and the cordless handset 50 is removed from the user's ear. In this way, an alarm sound is not generated near the user's ear. This system can inhibit an alarm sound from harming a user's hearing. Meanwhile, if the preset alarm time comes while a user is operating the user I/F 55 of the cordless handset 50, an alarm sound goes off at a lower volume than the preset volume immediately after the user finishes the operation on the user I/F 55. That is, an alarm sound is generated while the cordless handset 50 is in the user's hand. This can also inhibit the alarm sound from harming the user's hearing.

Moreover, the hold time can be changed by the user to an arbitrary length of time by conducting the hold time setting process shown in FIG. 6.

Furthermore, a user can be informed that the preset alarm time has come, even before the hold time passes, by simply looking at the display panel 54. Due to the processes of S210 to S230 shown in FIG. 5, the alarm screen image is displayed on the display panel 54 immediately after the cordless handset 50 goes back to a standby status from a call status.

Still furthermore, a user can be informed that the preset alarm time has come without having the user's hearing harmed by an alarm sound, before the hold time passes. This is because an alarm sound is outputted at a preset volume from the speaker unit 67, after the cordless handset 50 goes back to a standby status from a call status due to the cordless handset 50 being connected to the charger 80 before the hold time passes, by the processes of S240 and S260 shown in FIG. 5.

In the present exemplary embodiment, the telephone terminal with an alarm of the present invention is applied to the cordless handset 50 of the telephone set 1. The telephone terminal with an alarm of the present invention can be applied to other kinds of telephones, such as an extra handset of a facsimile or multifunction machine with a base unit and an extra handset, or a cellular telephone, among others.

As mentioned above, modifications are possible in the exemplary embodiments described above without materially departing from the novel teachings and advantages of this invention. All such modifications are intended to be included within the scope of this invention.

What is claimed is:

1. A method of controlling a timing and a sound level of an audible alarm sound and a visual alarm display of a telephone terminal with an alarm, comprising the steps of:
   initiating a cycle of alarm output control,
   determining if a present time is equal to a preset alarm time,
   determining a status of the telephone terminal,
   initiating a temporary alarm display when the status of the telephone terminal is a standby status and the present time is equal to the preset alarm time,
   initiating a temporary alarm sound at a preset volume when the status of the telephone terminal is standby status and the present time is equal to the preset alarm time,
   initiating an alarm hold process when the status of the telephone terminal is not standby status and the present time is equal to the preset alarm time, and
   terminating a cycle of control when the present time is not equal to the preset alarm time,
   returning to the beginning of the alarm output control.

2. A telephone terminal with an alarm comprising:
   a transmitter/receiver for inputting and outputting audible sound,
   an operation unit for accepting user input, and
   an alarm sound generator capable of producing an audible alarm sound, and
   an electronic clock device for determining at least a present time, an elapsed time, a predetermined time, and a preset alarm time, and
   wherein the telephone terminal with an alarm further comprises:
   a first alarm sound controller, and
   a second alarm sound controller;
   wherein the first alarm sound controller causes the alarm sound generator to temporarily generate the alarm sound at a preset volume,
      when the telephone terminal is in a standby status, and
      when the present time equals the preset alarm time;
   wherein the second alarm sound controller causes the alarm sound generator to temporarily generate the alarm sound at the preset volume,
      when the present time equaled the preset alarm time during a telephone call, and
      when the elapsed time from a termination of the call is at least equal to the predetermined time, wherein the termination of the call is determined by the changing of the telephone terminal from a call status to the standby status.

3. The telephone terminal with alarm as set forth in claim 2, wherein;
the predetermined time is at least equal to an average amount of time required for a user to set down a telephone transmitter/receiver after the completion of a telephone call.

4. The telephone terminal with alarm as set forth in claim 2, the operation unit further comprising;
a setting inputter, and
a hold time changer,
wherein the setting inputter accepts a user value for the predetermined time, and
wherein the hold time changer causes the predetermined time to equal the user value.

5. The telephone terminal with alarm as set forth in claim 2, further comprising;
an alarm image displayer, and
an alarm image controller,
wherein the alarm image displayer temporarily displays an alarm screen image to visually indicate that the present time equaled to the preset alarm time, and
wherein the alarm image controller causes the alarm image displayer to display the alarm screen image
when the present time equaled the preset alarm time during a telephone call, and
when the telephone terminal is in the standby status.

6. The telephone terminal with alarm as set forth in claim 2, further comprising;
a cordless handset,
a changer, adapted to detachably electrically connect to the handset,
wherein the changer changes a battery used to power the cordless handset, and
wherein the second alarm sound controller causes the alarm sound generator to temporarily generate the alarm sound,
when the cordless handset is placed on the charger when the elapsed time at less then the predetermined time,
wherein the placing of the cordless handset on the charger causes the telephone terminal to be standby status.

7. A method of controlling the timing and sound level of the audible alarm sound and the visual alarm display of the telephone terminal with the alarm set forth in claim 2, wherein the alarm hold process further comprises the steps of:
initiating the alarm hold process,
determining whether the status of the telephone terminal is standby,
returning to a start of the alarm hold process when the status of the telephone terminal is not standby,
determining a previous status of the telephone terminal when the telephone terminal status is standby,
initiating the temporary alarm display when the previous status of the telephone terminal is a call status caused by a previous telephone call,
determining whether a handset of the telephone terminal is returned to a charger when the previous status of the telephone terminal is call status,
determining if a hold time is at least equal to an elapsed time from the termination of the telephone call when the previous status of the telephone terminal is call status,
initiating the temporary alarm sound at the preset volume when the handset of the telephone terminal is returned to the charger when the previous status of the telephone terminal is call status and when the hold time is less than the elapsed time from the termination of the telephone call,
initiating the temporary alarm sound at the preset volume when the previous status of the telephone terminal is call status and when the hold time is at least equal to the elapsed time from the termination of the telephone call,
initiating the temporary alarm display when the previous status of the telephone terminal is an operation status,
initiating the temporary alarm sound at a level lower than the preset level when the previous status of the telephone terminal is operation status,
terminating the alarm hold process.

8. The telephone terminal with an alarm as set forth in claim 2, comprising:
a third alarm sound controller;
wherein the third alarm sound controller causes the alarm sound generator to temporarily generate the alarm sound at a lower volume than the preset volume,
when the present time equaled the preset alarm time during operation of the telephone terminal, and
when the operation of the telephone terminal is complete,
wherein the completing of the operation of the telephone terminal is determined by the changing of the telephone terminal from an operation status to a standby status.

9. A telephone terminal with an alarm, comprising:
a transmitter/receiver for inputting and outputting audible sound,
an operation unit for accepting user input, and
an alarm sound generator capable of producing an audible alarm sound, and
an electronic clock device for determining at least a present time, an elapsed time, a predetermined time, and a preset alarm time, and
a unit for determining if a present time is equal to a preset alarm time,
a unit for determining a status of the telephone terminal,
a unit for initiating a temporary alarm display when the status of the telephone terminal is a standby status and the present time is equal to the preset alarm time,
a unit for initiating a temporary alarm sound at a preset volume when the status of the telephone terminal is standby status and the present time is equal to the preset alarm time, and
a unit for initiating an alarm hold process when the status of the telephone terminal is not standby status and the present time is equal to the preset alarm time.

* * * * *